US012789336B2

(12) United States Patent
Brain

(10) Patent No.: US 12,789,336 B2
(45) Date of Patent: Nov. 10, 2026

(54) LOCKING NUT KEY

(71) Applicant: DYNOMEC LTD, Castleford (GB)

(72) Inventor: David Brain, Castleford (GB)

(73) Assignee: DYNOMEC LTD, Castleford (GB)

( * ) Notice: Subject to any disclaimer, the term of this patent is extended or adjusted under 35 U.S.C. 154(b) by 616 days.

(21) Appl. No.: 18/255,856

(22) PCT Filed: Dec. 2, 2021

(86) PCT No.: PCT/GB2021/053149
§ 371 (c)(1),
(2) Date: Jun. 2, 2023

(87) PCT Pub. No.: WO2022/118024
PCT Pub. Date: Jun. 9, 2022

(65) Prior Publication Data

US 2024/0009817 A1 Jan. 11, 2024

(30) Foreign Application Priority Data

Dec. 4, 2020 (GB) ..................................... 2019179

(51) Int. Cl.
*B25B 27/18* (2006.01)
*B25B 13/48* (2006.01)
*B25B 27/00* (2006.01)

(52) U.S. Cl.
CPC ............ *B25B 27/18* (2013.01); *B25B 13/485* (2013.01); *B25B 27/0035* (2013.01)

(58) Field of Classification Search
None
See application file for complete search history.

(56) References Cited

U.S. PATENT DOCUMENTS 5,551,320 A * 9/1996 Horobec ............... B25B 13/065 81/53.2
6,098,499 A 8/2000 Pool
6,134,992 A * 10/2000 Perkins ................... B25B 13/32 279/108
9,056,359 B1 6/2015 Clark et al.
10,513,147 B1 12/2019 Christensen
10,549,355 B1 2/2020 Parker et al.

OTHER PUBLICATIONS

Combined Search and Examination Report for GB2019179.7 dated May 27, 2021, 7 pages.
International Search Report and Written Opinion of the ISA for PCT/GB2021/053149 mailed Feb. 22, 2022, 10 pages.

* cited by examiner

*Primary Examiner* — Brian D Keller
(74) *Attorney, Agent, or Firm* — Nixon & Vanderhye, PC

(57) ABSTRACT

A locking nut key for aiding the removal of a locking wheel nut is disclosed having a patterned groove and defining a longitudinal axis (L), the key including a head portion for engagement with a tool, and a wall extending from the head portion at a proximal end to a free distal end along the longitudinal axis (L) of the key. The wall includes an outer surface and an inner surface, the outer surface of the wall includes a thickening between the proximal end and the distal end, the outer surface has a first diameter between the proximal end and the thickening and a second diameter at the distal end, the outer surface has a third diameter at the thickening, and the third diameter is greater than the first diameter and the second diameter.

16 Claims, 9 Drawing Sheets

LOCKING NUT KEY

CROSS REFERENCE TO RELATED APPLICATION

The present application is a National Phase of International Application Number PCT/GB2021/053149 filed Dec. 2, 2021, which designated the U.S. and claims priority benefits from Great Britain Application Number GB 2019179.7, filed Dec. 4, 2020, the entire contents of each of which are hereby incorporated by reference.

FIELD

The present invention relates to a locking nut key for aiding the removal of a locking wheel nut having a patterned groove, a system comprising the locking nut key and a tool and a method of using the locking nut key for removing the locking wheel nut.

BACKGROUND

Modern car wheels are typically attached to an axle of the car via several wheel nuts. Typically, one of these wheel nuts is a locking wheel nut to prevent theft. The locking wheel nut has a patterned groove that requires a complimentary shaped locking wheel nut key to remove the locking wheel nut from the axle.

However, often a vehicle owner will not have the key in the event of a breakdown, for instance, after sustaining a flat tyre and as such, the vehicle owner or breakdown technician will be unable to remove the wheel at the roadside as further specialist equipment would be required.

Traditional techniques for removing the locking wheel nut from the wheel in the absence of the locking nut key involve the use of a one-time use adapter. This adapter may be forced into the groove of the locking wheel nut and rotated to remove the locking wheel nut from the wheel. An impact driver, which converts a linear force to a rotational force, may be used to apply a rotational force to the known adapters.

However, following this process, the adapter and locking wheel nut will be fixed together and so the adapter and locking wheel nut may not be used again, without the use of specialist equipment. Further, the traditional one-time adapter requires the use of specialist equipment for its use.

There is a need to provide a universal locking nut key that solves some of the above-mentioned problems.

SUMMARY

According to the present invention there is provided an apparatus and method as set forth in the appended claims. Other features of the invention will be apparent from the dependent claims, and the description which follows.

According to a first example, there is provided a locking nut key for aiding the removal of a locking wheel nut having a patterned groove, the locking nut key defining a longitudinal axis, the key comprising a head portion for engagement with a tool, and a wall extending from the head portion at a proximal end to a free distal end along the longitudinal axis of the key, the wall comprising an outer surface and an inner surface, wherein the outer surface of the wall comprises a thickening between the proximal end and the distal end, wherein the outer surface has a first diameter between the proximal end and the thickening and a second diameter at the distal end, wherein the outer surface has a third diameter at the thickening, wherein the third diameter is greater than the first diameter and the second diameter. The locking nut key provided here will efficiently adapt to the shape of a patterned groove of a wheel locking nut, in use, whilst still maintaining sufficient strength to enable the key to be subsequently rotated. The locking nut key provided here is also advantageously reusable.

In one example, the first diameter of the outer surface may be substantially uniform between the proximal end and the thickening. In another example, the outer surface is tapers inward from the proximal end first diameter. In one example, the outer surface may taper inwards from the thickening to the distal end of the wall.

In one example, the first diameter of the outer surface may be approximately 10 mm to 20 mm, more preferably between 14 mm to 16 mm. The second diameter of the outer surface may be between approximately 8 mm to 18 mm more preferably between 11 mm to 16.5 mm. The third diameter of the outer surface may be between approximately 12 mm to 25 mm, more preferably between 15 mm to 19 mm. In the examples, the third diameter is greater than the first diameter and the second diameter.

In one example, the inner surface may taper outward from the proximal end to the distal end of the annular wall.

In one example, the inner surface may have a frusto-conical profile.

The inner surface may have a substantially uniform diameter between the proximal end and a first taper point, wherein the inner surface tapers outward from the first taper point to the distal end of the wall. The inner surface may taper out to meet the outer surface at an edge at the distal end of the wall. In one example, the inner surface has a second taper point located toward the proximal end of the wall, wherein the inner surface may taper inward from the second taper point to the proximal end of the wall. In these examples, the inner surface has a substantially uniform diameter across the majority of the length of the wall, e.g. upwards of 80% of the wall.

In one example, the head portion may comprise a hexagonal profile. Advantageously, this allows for connection to a plurality of different tools.

In one example, the head portion may comprise a threaded aperture which is aligned with the axis of the locking nut key. The threaded aperture advantageously allows for the locking nut key to be removed from the locking wheel nut, without the need for specialist equipment to uncouple the locking nut and the locking nut key, such that the locking nut key may be reused.

In one example, the key may be formed of an alloy steel.

In one example, the wall may be substantially annular.

In one example, the second diameter is less than the first diameter.

In one example, there is provided a system comprising the locking nut key as described above;

and a tool coupled to the head portion of the locking nut key.

In one example, the tool may comprise an elongate body having a first end and a second end, wherein the locking nut key is received in a socket at the second end of the body.

In one example, the system may further comprise a shroud configured to fit around the tool body to align the locking nut key and said locking nut, in use. The shroud may comprise a shroud body having a slit such that the shroud may concentrically stacked around the tool body. The shroud may advantageously align the locking nut key and the locking nut; this ensures that the locking nut key and the tool are secured to the locking nut.

In one example, there is provided a method of removing a locking wheel nut comprising the steps of: driving the locking nut key as described above into a locking wheel nut to deform the distal end of the key to the patterned groove; and rotating the locking nut key to loosen the locking wheel nut. In one example, there is provided a locking wheel nut key comprising a head portion and an annular wall projecting from the locking wheel nut along a longitudinal axis of the key. The thickness of the wall varies along the length of the longitudinal axis and comprises a thickening between a proximal end of the wall and a distal end of the wall.

In one example, there is provided a locking nut key for aiding the removal of a locking wheel nut having a patterned groove, the locking nut key defining a longitudinal axis, the key comprising a head portion for connection with a tool and a deformable portion extending from the head portion. The deformable portion is shaped to have a thickening between a proximal end of the deformable portion and a distal, free end of the deformable portion.

All of the features contained herein may be combined with any of the above aspects, in any combination.

Although a few preferred embodiments of the present invention have been shown and described, it will be appreciated by those skilled in the art that various changes and modifications might be made without departing from the scope of the invention, as defined in the appended claims.

BRIEF DESCRIPTION OF DRAWINGS

For a better understanding of the invention, and to show how embodiments of the same may be carried into effect, reference will now be made, by way of example only, to the accompanying diagrammatic drawings in which.

DETAILED DESCRIPTION

Figure 1A:
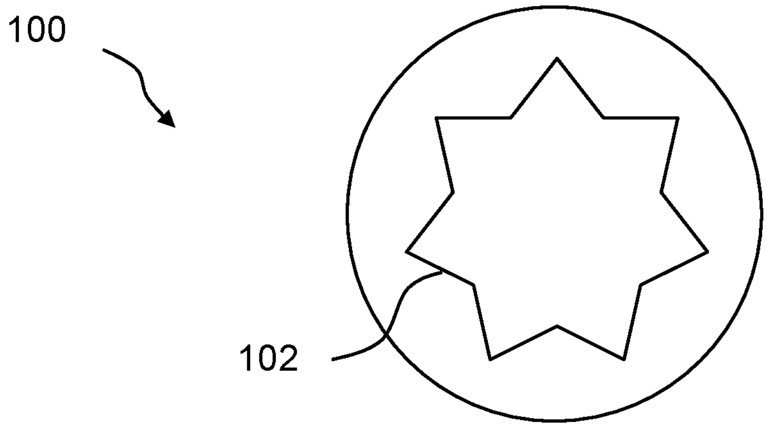
FIGS. 1A, 1B and 1C show examples of locking wheel nuts, each having a different shaped patterned grove.
Figure 1B:
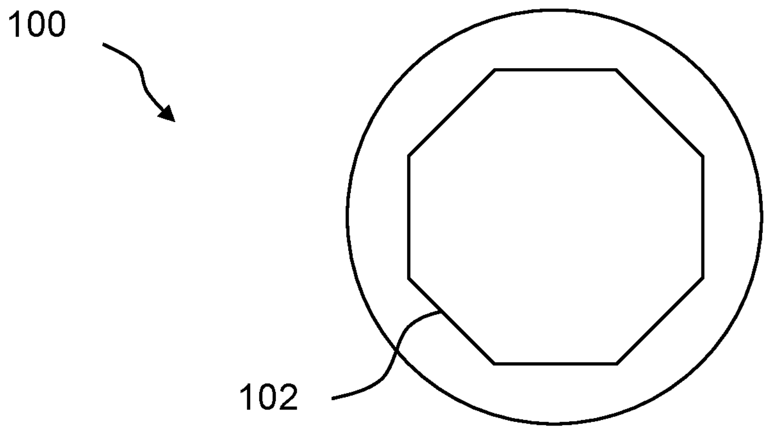
Figure 1C:
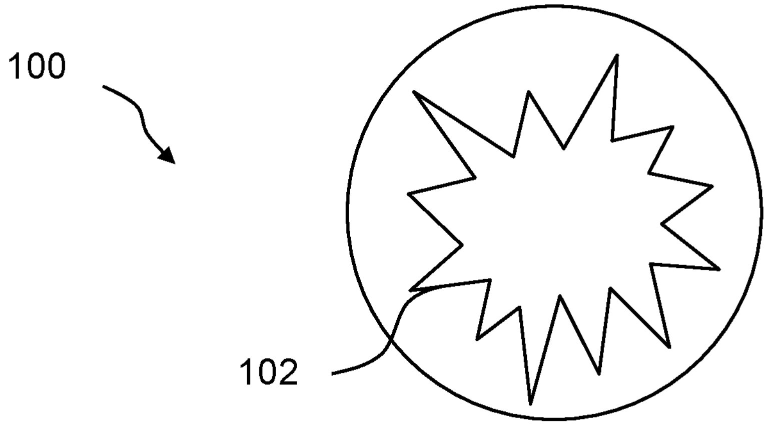

FIGS. 1A, 1B and 1C show end views of examples of different locking wheel nuts 100. The locking wheel nut 100 is configured to attach a wheel (not shown) to an axle of a car (not shown). The locking wheel nut 100 typically comprises a head end having a patterned groove or recessed pattern 102 and a threaded portion. The shape of the patterned groove 102 is typically dependent on the brand of car that the wheel is designed to be used with. In the example of FIG. 1A, the patterned groove 102 comprises a seven-pointed star, but many other shapes/configurations of the patterned groove 102 are available, for example as shown in FIGS. 1B and 1C.

The locking wheel nut 100 is typically used together with several regular hexagonal shaped nuts to connect the wheel to the car. The regular hexagonal shaped nuts can be removed using standard tools such as a spanner/socket wrench. In order to remove the locking wheel nut 100*a*, additional tooling is required. For example, a standard key may be used that includes a projection that matches the profile of the pattern groove 102. The projection of the standard key may be inserted into the patterned groove 102 of the locking wheel nut 100 to engage the locking wheel nut 100. The other end of the standard key may have a hexagonal shaped nut that can couple with the standard tool as per the other nuts. Therefore, once the standard key is engaged with the patterned groove 102, the key may be rotated to remove the locking wheel nut 100.

FIGS. 1B and 1C show examples of locking wheel nuts 100 with different profiles of patterned grooves 102. The patterned groove 102 in the locking wheel nut 100 of FIG. 1B is a regular octagon shape. The patterned groove 102 shown in the locking wheel nut 100 of FIG. 1C comprises an irregular shape with many sharp angles between parts of the patterned grooves 102. The patterned grooves 100 shown in FIGS. 1A, 1B and 1C are merely examples and any shape may be used, in practice. Differently shaped standard keys would be required to engage with the patterned grooves 102 for each of the locking wheel nuts 100 shown in the examples shown in FIGS. 1A, 1B and 1C.

Figure 2:
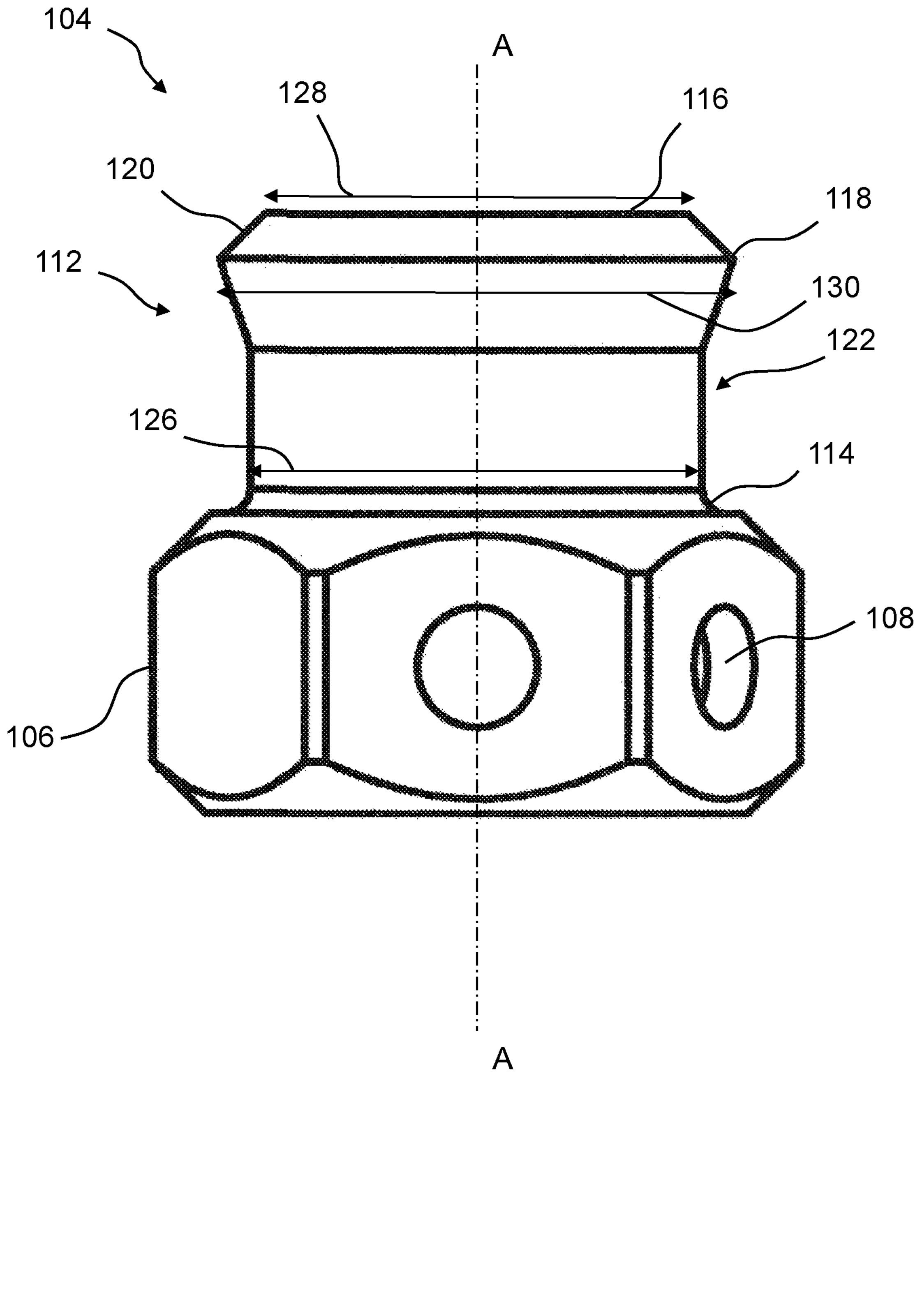
FIG. 2 shows a side view of an example of a locking nut key.

FIG. 2 shows an example of a locking nut key 104 for aiding the removal of a locking wheel nut 100 having a patterned groove 102. The locking nut key 104 defines a longitudinal axis A-A. In other words, the locking nut key 104 may be substantially elongate.

The locking nut key 104 includes a head portion 106 at one end of the key 104. The head portion or connector 106 is shaped to couple to an apparatus, such as a spanner, socket wrench or tool 200 described later, to apply force to the locking nut key 104. In one example, the head portion 106 is substantially hexagonal shaped. That is to say that the head portion 106 may have a hexagonal profile in cross section. An apparatus comprising a corresponding hexagonal shaped recess may be coupled to the head portion 106 of the locking nut key 104, in use. For example, the head portion 106 may have a similar shape to the other wheel nuts that couple the wheel to the axle of the car. The provision of a hexagonal profile for the head portion 106 offers versatility and freedom to the user as they do not require further specialist tooling, which reduces expense and makes the locking nut key 104 more user friendly. In one example, the diameter of the head portion 106 may be greater than 15 mm and less than 23 mm, more preferably 19 mm.

As shown in FIG. 2, the head portion 106 may include one or more indentations 108. The indentations 108 may serve as identification markers for different sizes of key 104. For example, a nut 104 having one indentation may differ in size from a nut 104 having two indentations, as shown in FIG. 2.

Figure 3:
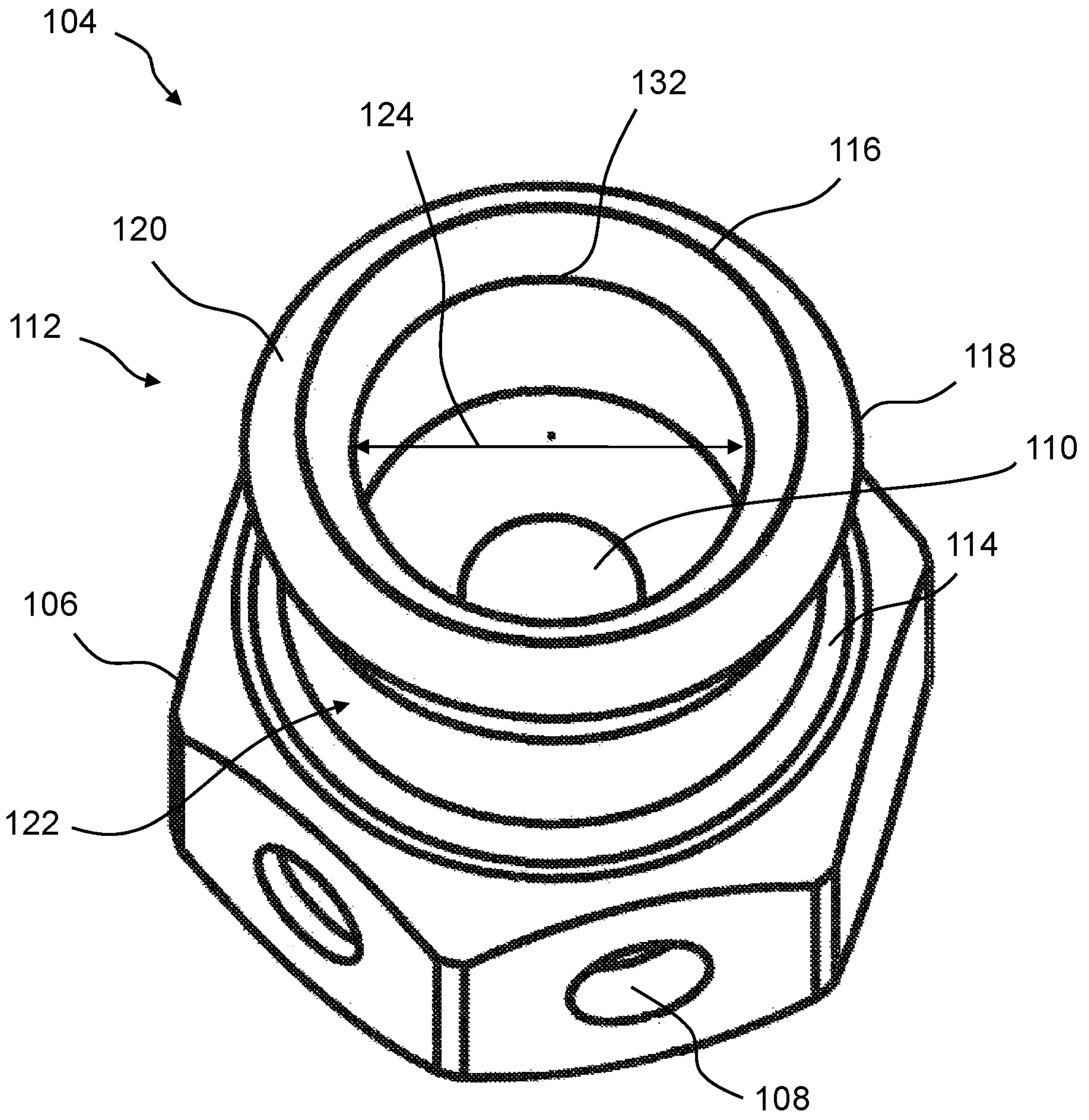
FIG. 3 shows a perspective view of an example of the locking nut key.
Figure 4:
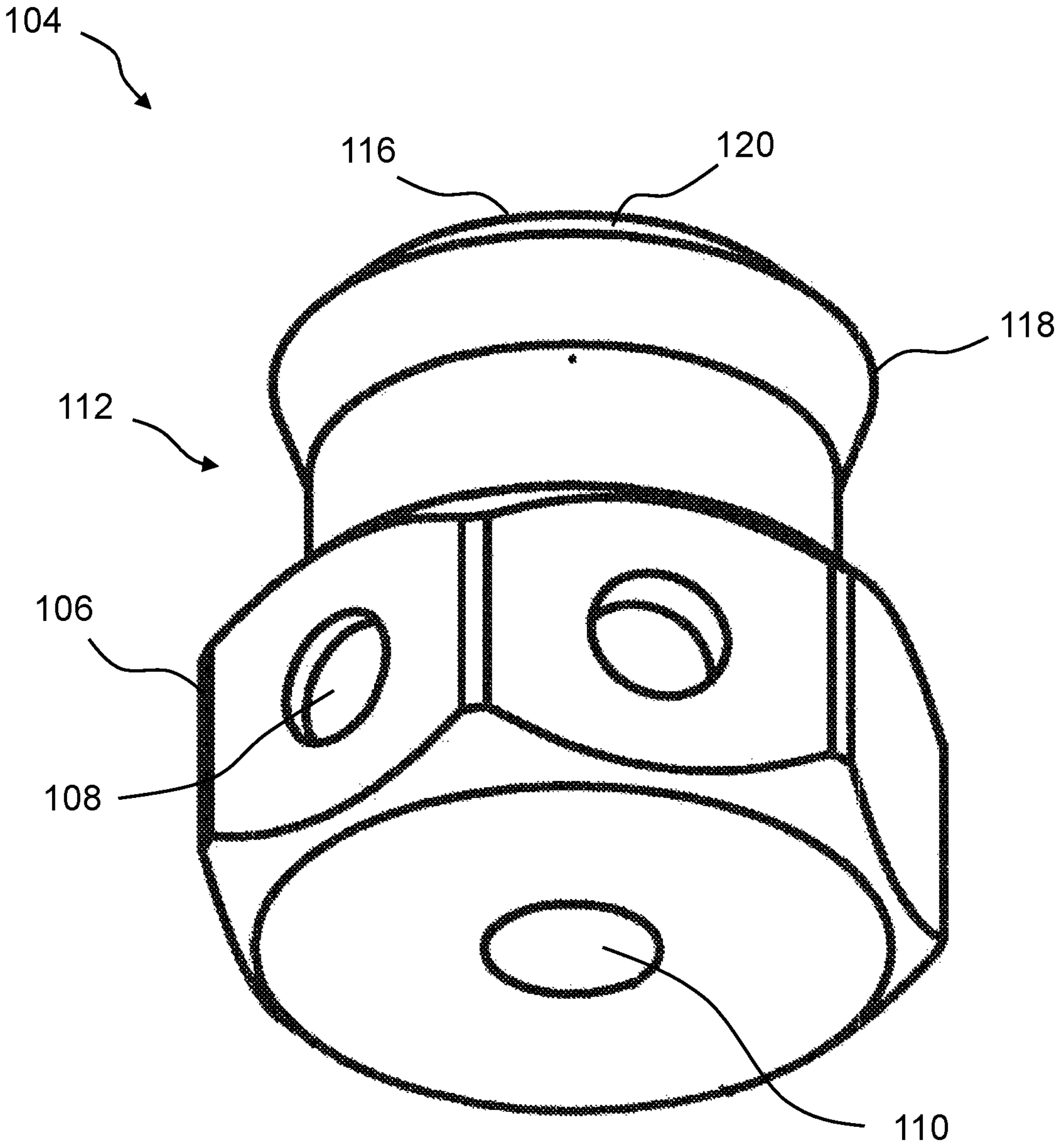
FIG. 4 shows a second perspective view of an example the locking nut key.

The head portion 106 may include an aperture 110, which isn't shown in FIG. 2, but is shown in more detail in FIGS. 3 and 4. The aperture 110 may be aligned with the longitudinal axis A-A of the key 104. The aperture 110 may be located in an end face of the head portion 106. In some examples, the aperture 110 is threaded for receiving a correspondingly threaded fixture. In use, the tool 200 (shown in FIG. 6) may have a correspondingly threaded fixture that may be received in the aperture 100 to couple the tool 200 to the locking nut key 104. Combining the tool 200 with the locking nut key 104 provides a solid unit to ensures a rigid assembly, eliminating any joint instability that would be present otherwise. As a result, the user has more confidence to strike the rigid, assembled system including the tool 200 and key 104, in use.

As will be described in more detail below, after the locking wheel nut 100 has been removed from the car, an extractor tool may be pushed through the aperture 110 of the nut 104 to push the removed wheel nut 100 from the key 104. For example, a correspondingly threaded extractor tool may be threaded through the threaded aperture 110 to push the removed wheel nut 100 from the key 104. Providing a through-hole 110 avoids the need for further equipment, such as a vice, to be used for removing the removed wheel nut 100 from the key 104.

Returning to FIG. 2, the locking nut key 104 includes a wall 112 having a proximal end 114 coupled to the head portion 106 and a distal end 116. In other words, the wall 112 extends from the head portion 106 at the proximal end 114 to a free distal end 116 in a direction along the longitudinal axis A-A of the locking nut key 104. In one example, the wall 112 is substantially annular. The wall 112 may have a substantially ring-shaped cross-section. In one example, the length of the wall 112 from the proximal end 114 to the distal end 116 may be greater than 7 mm and less than 13 mm, more preferably between 8 mm and 10 mm.

The wall 112 comprises an outer surface or outer diameter 122 and an inner surface or inner diameter 124 (shown in FIG. 3). Outer surface may be used interchangeably with outer diameter or external diameter. Inner surface may be used interchangeably with inner diameter.

The outer surface 122 has a first diameter 126 between the proximal end 114 of the wall 112 and a thickening 118. The first diameter 126 may be considered to be the minimum diameter of the outer surface 122 between the proximal end 114 and the thickening 118.

There may be a slight curved section due to manufacturing process between the head portion 106 and wall 112 at the proximal end 114 of the wall. In the example shown in FIG. 2, there is a uniform region of the outer surface 122 with the first diameter 126. However, in other examples, the outer surface 122 may taper inward to the first diameter 126.

The outer surface 122 has a second diameter 128 at the distal end 116. The second diameter 128 may be less than the first diameter 126. The outer surface 122 comprises a thickening 118 between the proximal end 114 and the distal end 116. The thickening 118 has a third diameter 130 that is larger than the first diameter 126 and the second diameter 128.

In some examples, the wall thickening 118 is located towards the distal end 116 of the wall 112, for example, closer to the distal end 116 than the proximal end 114. The wall thickening 118 may take a variety of shapes in practice.

A region of the wall 112 is deformable such that it may conform to the shape of a patterned groove 102, upon the application of force. In one example, a tapered region 120 that is located between the thickening 118 and the distal end of the key 104 is configured to deform. In some examples, the thickening 118 and further parts of the wall 112 may also deform, in use.

The wall 112 comprises an inner surface 124 (shown in FIG. 3). The wall thickness is set by the difference between the outer surface 122 and the inner surface 124 at a given point. In one example, the diameter of the outer surface 122 is substantially uniform between the proximal end 114 and the thickening 118 of the wall 112. In other words, the outer surface 122 of the wall 112 may have the first diameter 126 between the proximal end 114 and the thickening 118. The outer surface 122 may taper outwards from the region of outer surface 122 having a uniform diameter to form the thickening 118, then may taper inwards from the thickening 118 to the distal end 116 of the wall 112. Tapering inward means tapering towards the central longitudinal axis A-A of the locking nut key and tapering outwards means tapering away from the longitudinal axis A-A of the locking nut key 104.

FIG. 3 shows a perspective view of the locking nut key 104. FIG. 3 shows the inner surface 124 of the wall 112. In one example, the inner surface 124 of the wall 112 tapers inwards from the proximal end 114 to the distal end 116. In one example, the inner surface 124 of the wall 112 has a relatively steep taper at the proximal end of the wall 112, followed by a relatively shallow taper to the thickening 118, followed by a relatively steep taper between the thickening 118 and the distal end 116 of the wall 112. In one example, the inner surface 124 is substantially uniform over most of the length of the wall 112, but has a taper to meet the outer surface at the distal end 116. That is to say that the inner surface 124 has a substantially uniform diameter between the proximal end 114 and a first taper point 132, wherein the inner surface tapers out from the first taper point 132 to the distal end 116 of the wall 112.

In one example, the inner surface 124 has an internal diameter of between 7 mm and 14 mm, more preferably 9 mm to 12.5 mm. In one example, the inner surface 124 tapers to a diameter of between 10 mm and 17 mm at the distal end 116. The inner surface may have a taper of between 30 degrees to 60 degrees at the distal end 116. In one example, the internal diameter tapers over a length of approximately 1 mm to 3 mm at the distal end of the wall 112. The inner surface 124 and outer surface 122 may meet at the distal end 116 for from an edge, that is to say that the diameter of the inner surface 124 and the outer surface 122 may be the same at the distal end 115 of the wall 112 (i.e. the second diameter 128).

In one example, the inner surface 124 also tapers inward at the proximal end of the wall 112.

The provision of a thickening 118 in the wall 112 provides region with increased strength towards the distal end 116 of the wall 112. The thickening 118 may also help the overall malleability and range of the key 112.

As described above, locking wheel nuts 100 may come in different sizes and have different arrangements of patterned grooves 102. However, the approximate diameter of the patterned grooves 102 may be typically the same within different families of locking wheel nuts 100. That is to say that if a circle were to be drawn over the patterned groove 102 with diameter of the average of the diameter of each of the points of the patterned groove 102, then this average diameter would be aligned for many different patterned grooves 102 of locking wheel nuts 100 within the same family. The indentations 108 described above can indicate which key 104 is suitable for use with which family of locking wheel nuts 100.

In one example, the first diameter 126 of the outer surface 122 is between approximately 10 mm to 20 mm, more preferably between 14 mm to 16 mm. The second diameter 128 of the outer surface 122 may be between approximately 8 mm to 18 mm, more preferably between 11 mm to 16.5 mm. The third diameter 130 of the outer surface 122 may be between 12 mm to 25 mm, more preferably between 15 mm to 19 mm.

In the examples, the third diameter is greater than the first diameter and the second diameter. In some examples, the second diameter is less than the first diameter.

The distal end 116 of the annular wall 112 may be shaped to have a diameter corresponding to the average diameter of the patterned grove 102. That is to say that the second diameter 128 may approximately correspond to a mid-point of the patterned groove 102. The second diameter 128 may be sized to locate the mean diameter of the locking wheel nut 100. When the locking nut key 104 is driven into the patterned groove 102 of the wheel nut 100, the third diameter 130 of the thickening 118 may contact the most outer points of the patterned groove 102 of locking wheel nut 100, or the points of the patterned groove 102 locking wheel nut 100 with the maximum diameter. The presence of the thickening 118 provides additional strength to the key, whilst also ensuring a better coupling with the patterned groove 102.

When the locking nut key 104 is driven into the patterned groove 102 of the wheel nut 100, the tapering of the inner surface 124 of the wall 112 may contact the most inner points of the patterned groove 102 of the locking wheel nut 100, or the points of the patterned groove 102 of the locking wheel nut 100 with the minimum diameter. These features advantageously ensure that any gaps between the patterned groove 102 of the locking wheel nut 100 and the key 104 are bridged, such that traction is not lost during use.

The first diameter 126, second diameter 128 and third diameter 130 of the locking nut key 104 are dependent on the size of the locking wheel nut 100 to be removed. Generally, if the locking wheel nut 100 is a nut, rather than a bolt, then a threaded stud may be in the way; therefore, the first diameter 126, second diameter 128 and third diameter 130 must be large enough such that they are able to pass over the threaded stud. Locking wheel nuts 100 may also have obstacles such as dummy hexagon connectors, large diameter heads or anti-torque heads; therefore, it is important that the locking nut key 104 is able to pass over these obstacles. The locking nut key 104 provided here is adaptable to cope with the different sizes and designs of wheel locking nut 100 that may be produced.

Prior to use, the distal end 116 of the wall 112 may have a substantially ring-shaped cross-section. During use of the key 104, the distal end 116 and a region towards the distal end 116 is configured to deform to the shape of the patterned groove 102 of the locking wheel nut 100.

In use, the distal end 116 of the wall 112 may be aligned with the patterned groove 102 of the locking wheel nut 100. Put another way, a user may align the longitudinal axis A-A of the key 104 such that it passed through the centre of the patterned groove 102 of the locking wheel nut 100.

When the key 104 is aligned with the locking wheel nut 100, a linear force may be applied to the key 104, via the connector 106, to deform the distal end 116 of the key 104 to the shape of the patterned groove 102. In other words, the linear force will cause the distal end 116 to change shape such that part of the wall 112 is received in the patterned groove 102. In some example, not all of the tapered portion 120 is pushed into the patterned groove 102, such that only portion of the tapered portion 120 is pushed into the patterned groove 102. However, only a portion of the tapered portion needs to be pushed into the patterned groove to achieve a sufficient connection between the key 104 and the locking wheel nut 100. The tapered portion 120 is able to bridge gaps and collapse or flare out where required to conform to the shape of the patterned groove 102. In some examples, all of the thickening 118 is configured to deform and even a region between the thickening 118 and the proximal end 114 is configured to deform, in practice. In one example, approximately 2 mm to 6 mm, of the distal end 116 of the wall 112 is configured to deform, in use. In one example, approximately 3 mm to 5 mm, of the distal end 116 of the wall 112 is configured to deform, in use The application of linear force will be discussed in more detail below, but in the simplest form could be applied through a user striking a hammer against the key 104.

Following the deformation of the distal end 116 of the wall 112 to conform to the shape of the patterned groove 102, the key 104 may be rotated to rotate the locking wheel nut 100 and remove the locking wheel nut 100 from the axle of the wheel. As described above, an apparatus such as a spanner, socket wrench or tool 200 (discussed below) may be couple to the head portion 106 to apply a rotational force to the key 104. The locking wheel nut 100 is then removed together with the key 104. Following the removal of the locking wheel nut 100 and the key 104, the locking wheel nut 100 may be removed from the key 104 as by using a threaded extractor tool as described above.

Following the deformation of the key 104, the key 104 can then be used in future to remove a locking wheel nut 100 having the same recessed pattern 102. For example, following the replacement of the wheel, the original locking wheel nut 100 may be used to secure the wheel to the axle of the car. The user may then use the already deformed nut 104 to remove the locking wheel nut 100 in future. In this case, further deformation of the key 104 would not be required as the key 104 would have already been deformed to the shape of the patterned groove 102 of the wheel nut 100.

Figure 5A:
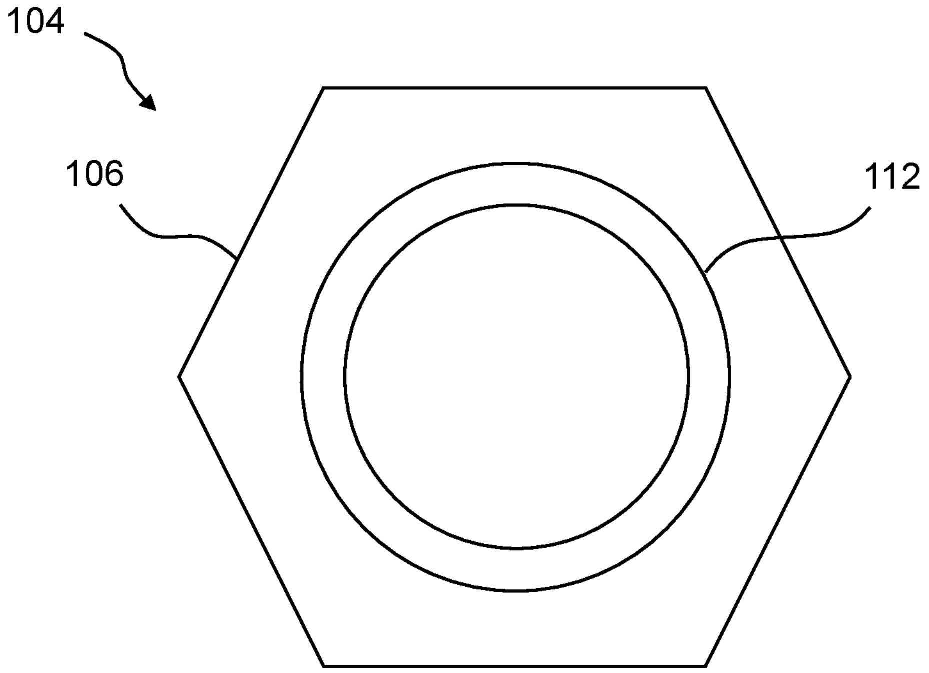
FIGS. 5A and 5C show end views of examples of undeformed locking nut keys.
Figure 5B:
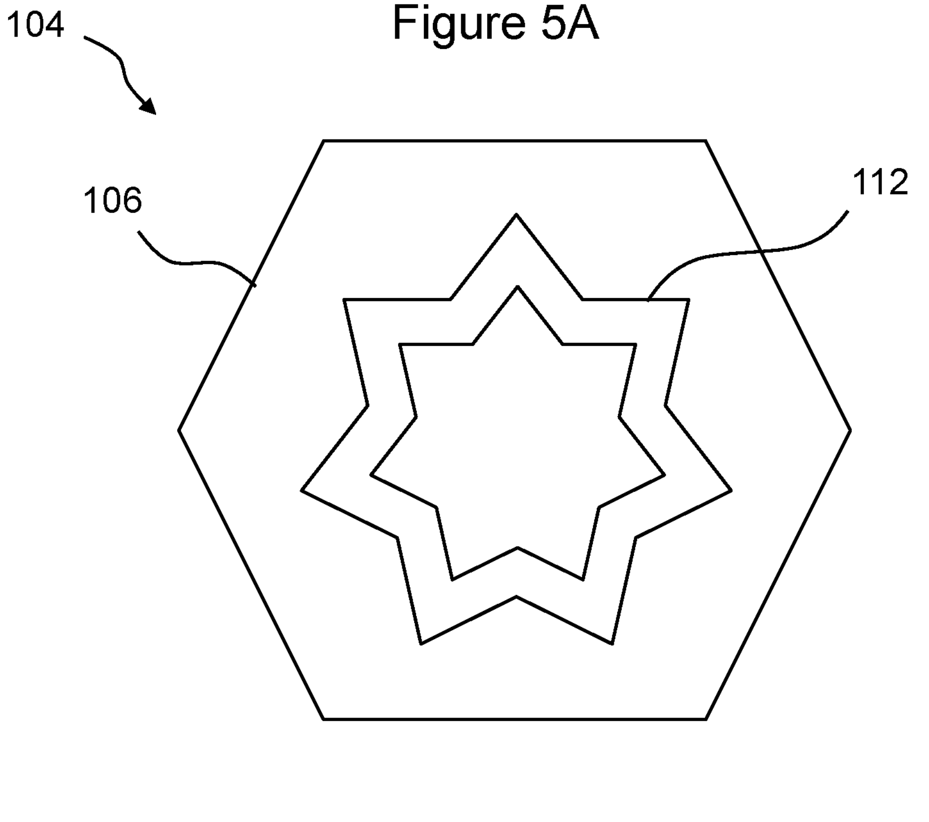
FIGS. 5B and 5D show pictures of end views of examples of deformed locking nut keys.
Figure 5C:
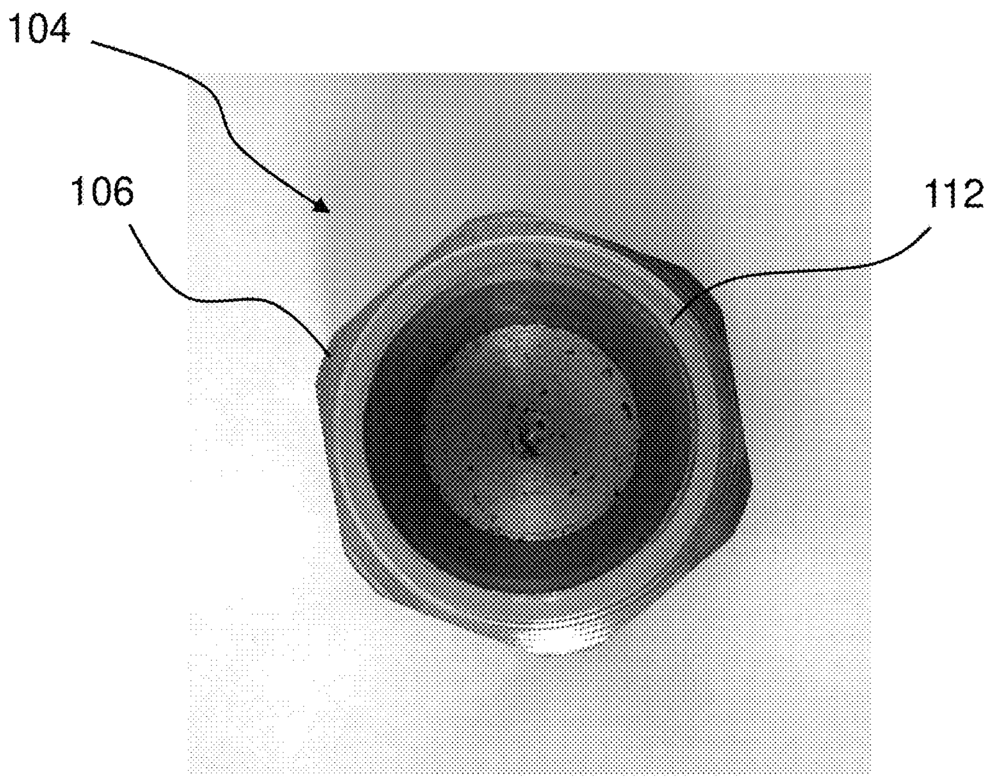

FIGS. 5A and 5C show examples of end on views of the key 104 in an undeformed state. In these example, the wall 112 comprises a substantially hollow element with a substantially circular cross section.

Figure 5D:
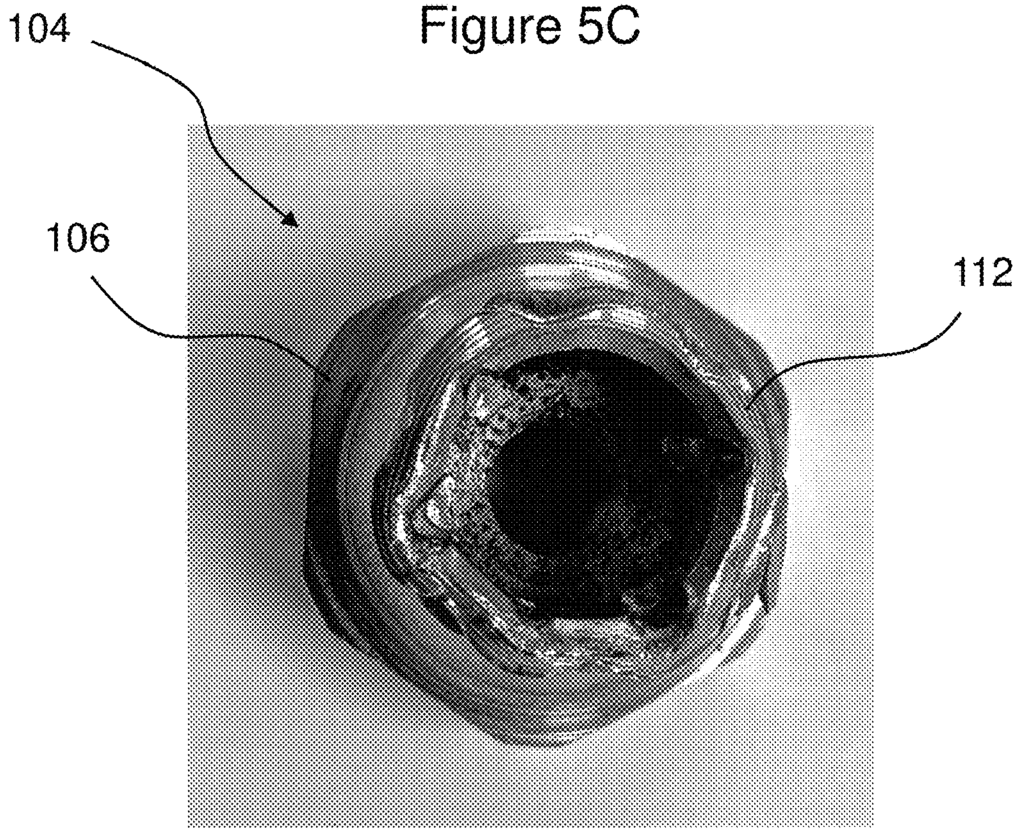

FIGS. 5B and 5D show examples of end views of the key 104 in a deformed state. For clarity, the undeformed region of the wall 112 is not shown in FIGS. 5B and 5D. In these example, the key 104 has been deformed to the patterned groove 102 shown in FIG. 1A.

The locking nut key 104 may be formed of a metal, such as steel. Preferably, the locking nut key 104 may be formed of a shock resistant, high carbon alloy steel.

Figure 6:
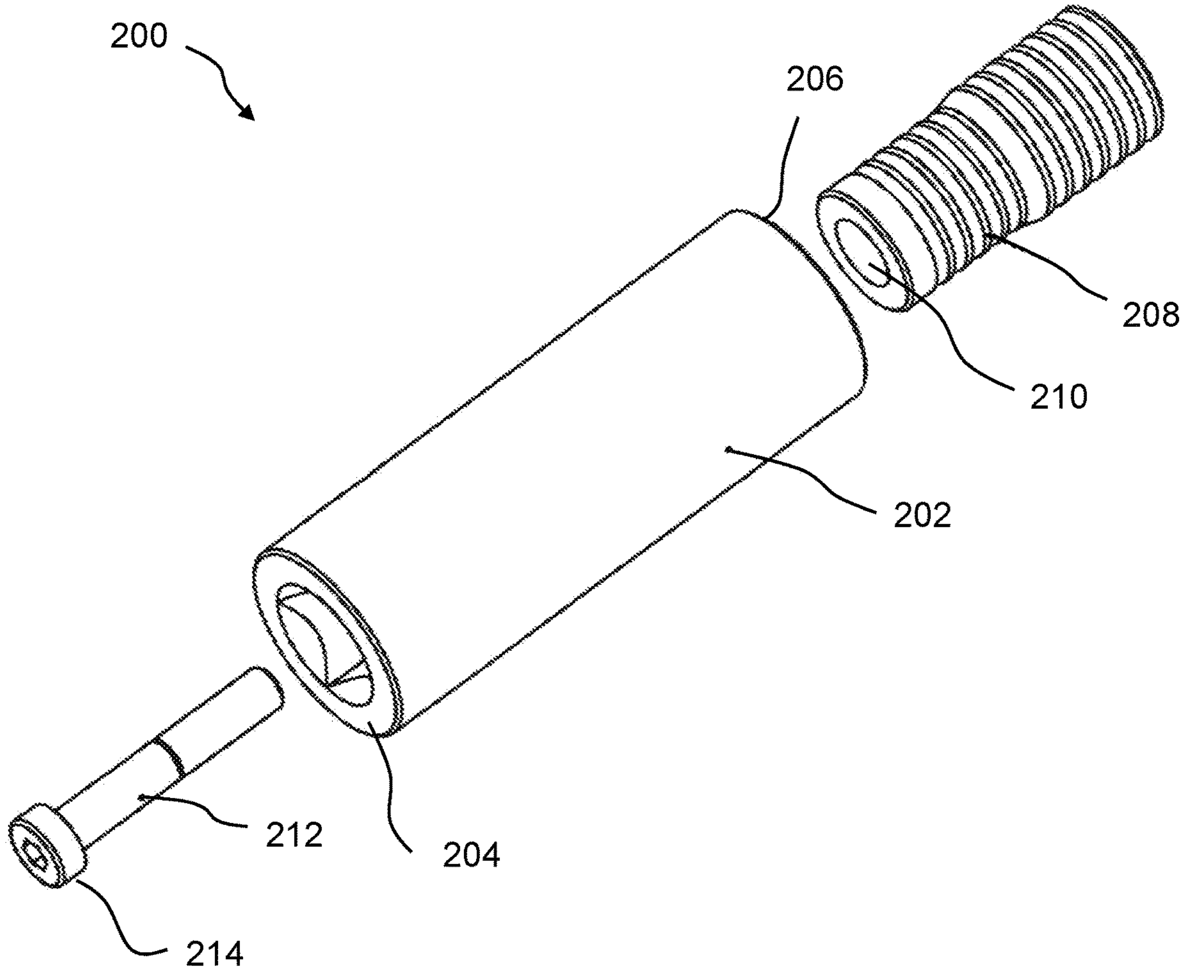
FIG. 6 shows an exploded view of a tool for use with the locking nut key.

FIG. 6 shows an exploded view of an example of a tool 200 for use with the key 104. In this example, the tool 200 comprises an elongate body 202 having a first end 204 and a second end 206.

The tool 200 may be used to couple a device, such as a manual impact driver, to the key 104, in use. For example, the manual impact driver may have a standard square connection head and this tool 200 may have a corresponding first socket at a first end and a second socket at the second end 206. The second socket may be shaped to conform to the shape of the head portion 106 of the key 104. For example, the head portion 106 of the key 104 may have a hexagonal cross-section and the second socket may comprise a hexagonal socket of the same size such that the head portion 106 may be received and engaged with the tool 200.

The body 202 may be substantially hollow and suitable for receiving a mandrel 208. The mandrel 208 is be fixed within the body 202 and comprises a threaded through-hole 210 for receiving a threaded fixture 212. In one example, the mandrel 202 is tapered from one end to the other and pressed into the hollow body such that there is a friction fit between the mandrel 208 and body 202.

The threaded fixture 212 may comprise a head end 214 suitable for coupling with an Allen® key or screwdriver or other connection implement.

In use, the threaded fixture 212 is inserted into the body 202 and coupled with the threaded through hole 210 of the mandrel and the aperture 110 of the key 104 to secure the key 104 to the body 202.

Figure 7:
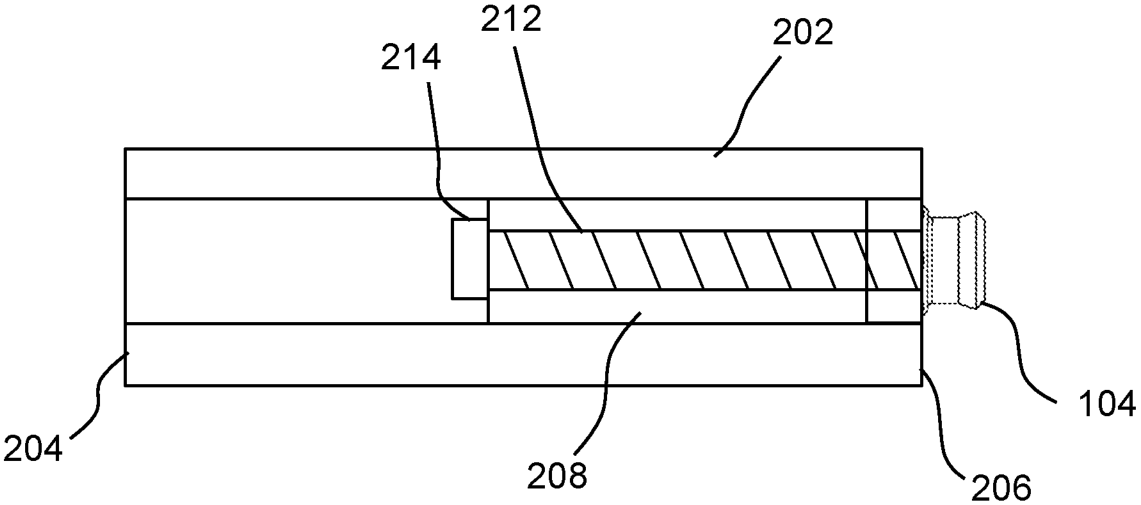
FIG. 7 shows a schematic cross-sectional view through the tool and locking nut key.

FIG. 7 shows a schematic cross-section of the tool 200 with the key 104 coupled to the tool 202. As shown in FIG. 7, the threaded fixture 212 may couple the key 104 to the tool 200 by extending though the aperture 210 of the mandrel 208 and the aperture 110 of the key 104.

In use, a liner force may be applied to the tool 200. The linear force may be generated by striking the first end 206 of the tool body 202 with a hammer. This linear force would pass through the tool 200 to the key 104 to deform the deformable portion 120 of the key 104 to the shape of the patterned groove 102 and engage the key 104 with the locking wheel nut 100. Following the engagement of the key 104 and the locking wheel nut 100, the tool 200 may be rotated to unscrew the locking wheel nut 100 from the axle of the wheel to remove the locking wheel nut 100. In one example, a manual impact driver (not shown) may be coupled with the first end 204 of the tool body 202. The user may strike the impact driver to apply a linear force to the tool body 202 and hence the key 104. The manual impact driver may then be moved to a second configuration and struck again to apply a rotational force to the tool body 202 and hence the key 104.

Figure 8:
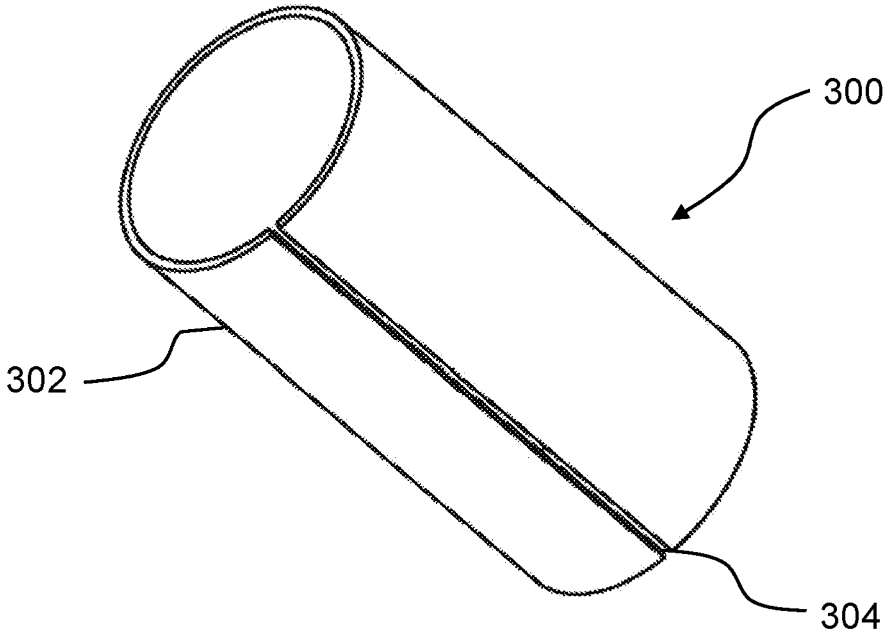
FIG. 8 shows a perspective view of an example of shroud.
Figure 9:
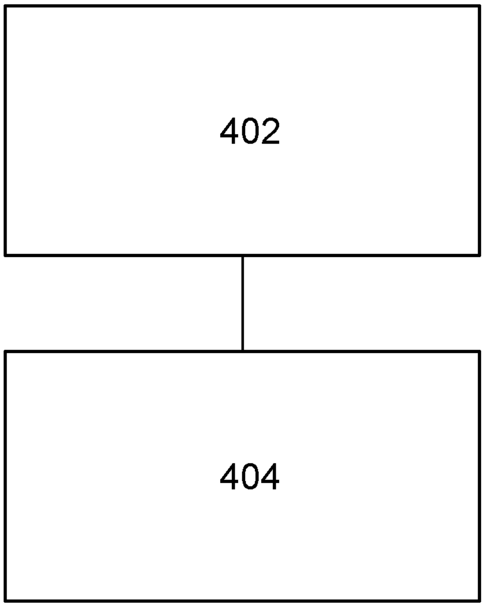
FIG. 9 shows an example of a flow chart of method steps of the use of the locking nut key.

FIG. 8 shows an example of a shroud 300 that may be used with the tool 200 and locking nut 104 to aid in the aligning of the locking nut key 104 and the locking wheel nut 100. In use, the split plastic shroud 300 is configured to fit around the body 202 of the tool 200 to align it with the locking wheel nut 100.

The shroud 300 comprises a shroud body 302 and a slit 304 that runs the length of the shroud body 302. The slit 304 enables a user to expand the diameter of the shroud body 302, in use. As such, the shroud may be stacked in a concentric fashion such that one shroud 300 may be located around another shroud 300 in use. The use of a plurality of shrouds 300 enables the tool to be used with wheels of different sizes.

At step 402, the locking nut key 104 is driven into a locking wheel nut to deform the distal end of the key to the patterned groove 102. At step 404, the locking nut 104 is rotated to loosen the locking wheel nut 100.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A locking nut key for aiding the removal of a locking wheel nut having a patterned groove, the locking nut key defining a longitudinal axis, the locking nut key comprising:

a head portion having a hexagonal profile for engagement with a tool, and a wall extending from the head portion at a proximal end to a free distal end along the longitudinal axis of the locking nut key, the wall comprising an outer surface and an inner surface, wherein the outer surface of the wall comprises a thickening defining an outmost edge between the proximal end and the distal end, wherein the outer surface has a first diameter between the proximal end and the thickening and a second diameter at the distal end, wherein the outer surface has a third diameter at the thickening, wherein the third diameter is greater than the first diameter and the second diameter, and wherein the outer wall tapers outwardly from the first diameter to the outmost edge defining a frusto-conical shape.

2. The locking nut key according to claim 1, wherein the first diameter of the outer surface is uniform between the proximal end and the thickening.

3. The locking nut key according to claim 1, wherein the outer surface tapers inward from the proximal end to the first diameter.

4. The locking nut key according to claim 1, wherein the outer surface tapers inward from the thickening to the distal end of the wall.

5. The locking nut key according to claim 1, wherein the first diameter of the outer surface is between 10 mm to 20 mm, the second diameter of the outer surface is between 8 mm to 18 mm and the third diameter of the outer surface is between 12 mm to 25 mm.

6. The locking nut key according to claim 1, wherein the inner surface has a uniform diameter between the proximal end and a first taper point, wherein the inner surface tapers out from the first taper point to the distal end of the wall.

7. The locking nut key according to claim 1, wherein the locking nut key is formed of an alloy steel.

8. The locking nut key according to claim 1, wherein the wall is annular.

9. The locking nut key according to claim 1, wherein the second diameter is less than the first diameter.

10. A system comprising:

the locking nut key according to claim 1; and a tool coupled to the head portion of the locking nut key.

11. The system according to claim 10, wherein the tool comprises an elongate body having a first end and a second end, wherein the locking nut key is received in a socket at the second end of the body.

12. The system according to claim 11, comprising a shroud configured to fit around the tool body to align the locking nut key and said locking nut, in use.

13. The system according to claim 12, wherein the shroud comprises a shroud body having a slit such that the shroud may concentrically stacked around the tool body.

14. A method of removing a locking wheel nut having a patterned groove, comprising the steps of:

providing a locking nut key defining a longitudinal axis comprising a head portion for engagement with a tool, and a wall extending from the head portion at a proximal end to a free distal end along the longitudinal axis of the key, the wall comprising an outer surface and an inner surface, wherein the outer surface of the wall comprises a thickening between the proximal end and the distal end, wherein the outer surface has a first diameter between the proximal end and the thickening and a second diameter at the distal end, wherein the outer surface has a third diameter at the thickening, wherein the third diameter is greater than the first diameter and the second diameter;

driving the locking nut key into the locking wheel nut to deform the distal end of the key to the patterned groove; and rotating the locking nut key to loosen the locking wheel nut.

15. A system, comprising:

a locking nut key for aiding the removal of a locking wheel nut having a patterned groove, the locking nut key defining a longitudinal axis, the locking nut key comprising:

a head portion for engagement with a tool, and a wall extending from the head portion at a proximal end to a free distal end along the longitudinal axis of the locking nut key, the wall comprising an outer surface and an inner surface, wherein the outer surface of the wall comprises a thickening defining an outmost edge between the proximal end and the distal end, wherein the outer surface has a first diameter between the proximal end and the thickening and a second diameter at the distal end, wherein the outer surface has a third diameter at the thickening, wherein the third diameter is greater than the first diameter and the second diameter, wherein the outer wall tapers outwardly from the first diameter to the outmost edge defining a frusto-conical shape, wherein the tool comprises a tool body, wherein the locking nut key is received in a socket an end of the tool body, a shroud having a slit configured to fit around the tool body, and a tool coupled to the head portion of the locking nut key.

16. A locking nut key for aiding the removal of a locking wheel nut having a patterned groove, the locking nut key defining a longitudinal axis, the locking nut key comprising:

a head portion for engagement with a tool, and a wall extending from the head portion at a proximal end to a free distal end along the longitudinal axis of the locking nut key, the wall comprising an outer surface and an inner surface, wherein the outer surface of the wall comprises a thickening defining an outmost edge between the proximal end and the distal end, wherein the outer surface has a first diameter between the proximal end and the thickening and a second diameter at the distal end, wherein the outer surface has a third diameter at the thickening, wherein the third diameter is greater than the first diameter and the second diameter, and wherein the outer wall tapers outwardly from the first diameter to the outmost edge defining a frusto-conical shape, wherein the head portion comprises a threaded aperture which is aligned with the axis of the locking nut key.

* * * * *